US008540120B2

(12) United States Patent
Newton et al.

(10) Patent No.: US 8,540,120 B2
(45) Date of Patent: Sep. 24, 2013

(54) FLUID MIXING AND DELIVERY SYSTEM

(75) Inventors: John R. Newton, Vero Beach, FL (US); Michael E. Cheney, Vero Beach, FL (US); Peter J. Brooke, Micco, FL (US)

(73) Assignee: Global Agricultural Technology and Engineering, LLC, Vero Beach, FL (US)

( * ) Notice: Subject to any disclaimer, the term of this patent is extended or adjusted under 35 U.S.C. 154(b) by 96 days.

(21) Appl. No.: 13/223,576

(22) Filed: Sep. 1, 2011

(65) Prior Publication Data

US 2013/0056493 A1 Mar. 7, 2013

(51) Int. Cl.
B67D 7/74 (2010.01)
B67D 7/78 (2010.01)
B67D 7/80 (2010.01)

(52) U.S. Cl.
USPC .................. 222/129.3; 222/129.1; 222/145.5

(58) Field of Classification Search
USPC ..................... 222/129.3, 129.1, 145.5; 137/7, 137/88, 111, 87.04
See application file for complete search history.

(56) References Cited

U.S. PATENT DOCUMENTS

| | | | |
|---|---|---|---|
| 5,868,279 A * | 2/1999 | Powell | 222/59 |
| 6,026,850 A | 2/2000 | Newton et al. | |
| 6,209,578 B1 | 4/2001 | Newton | |
| 6,269,973 B1 * | 8/2001 | Bennett et al. | 222/1 |
| 6,988,641 B2 * | 1/2006 | Jones et al. | 222/129.1 |
| 7,036,686 B2 * | 5/2006 | Newton | 222/129.1 |
| 7,311,225 B2 * | 12/2007 | Newton | 222/145.5 |
| 7,617,839 B2 * | 11/2009 | Newton | 137/315.04 |
| 8,087,544 B2 * | 1/2012 | Elsom et al. | 222/57 |
| 8,240,522 B2 * | 8/2012 | Newton et al. | 222/504 |
| 8,263,155 B2 * | 9/2012 | Crow et al. | 426/474 |
| 2002/0170925 A1 * | 11/2002 | Friedman | 222/129.1 |
| 2004/0144802 A1 | 7/2004 | Newton | |
| 2010/0107885 A1 * | 5/2010 | Kirschner et al. | 99/279 |
| 2011/0068118 A1 * | 3/2011 | Jones et al. | 222/1 |

OTHER PUBLICATIONS

International Search Report and Written Opinion in connection with International Patent Application No. PCT/US12/25636 mailed on Dec. 20, 2012.

* cited by examiner

Primary Examiner — J. Casimer Jacyna
Assistant Examiner — Benjamin R Shaw
(74) Attorney, Agent, or Firm — Gesmer Updegrove LLP

(57) ABSTRACT

A fluid mixing and delivery system comprises a mixing chamber; a first supply line for supplying a first fluid component to the mixing chamber via a first CFValve and a downstream first metering orifice; a second supply line for supplying a second fluid component to the mixing chamber via a second CFValve and a downstream second metering orifice, with the first and second fluid components being combined in the mixing chamber to produce a fluid mixture; and a discharge line leading from the mixing chamber and through which the fluid mixture is delivered to a dispensing valve.

4 Claims, 4 Drawing Sheets

FLUID MIXING AND DELIVERY SYSTEM

BACKGROUND OF THE INVENTION

1. Field of the Invention

This invention relates to a system for precisely metering and mixing fluids at variable mix ratios, and for delivering the resulting fluid mixtures at the same substantially constant flow rate for all selected mix ratios. The system is particularly useful for, although not limited in use to, the mixture of liquid beverage concentrates with a liquid diluent, one specific example being the mixture of different tea concentrates with water.

2. Description of Related Art

A known system for precisely metering and mixing fluids and for delivering the resulting fluid mixture at a substantially constant flow rate is disclosed in U.S. Pat. No. 7,311,225. Such systems do not, however, allow for changes in the mix ratio of the fluids.

SUMMARY OF THE INVENTION

Broadly stated, the primary objective of the present invention is to remedy this deficiency by providing a simple yet highly effective means of progressively varying the mix ratio over a wide range of adjustments, with the volume of delivered fluid mixture remaining substantially the same and substantially constant for all selected mix ratios.

DETAILED DESCRIPTION

Figure 1:
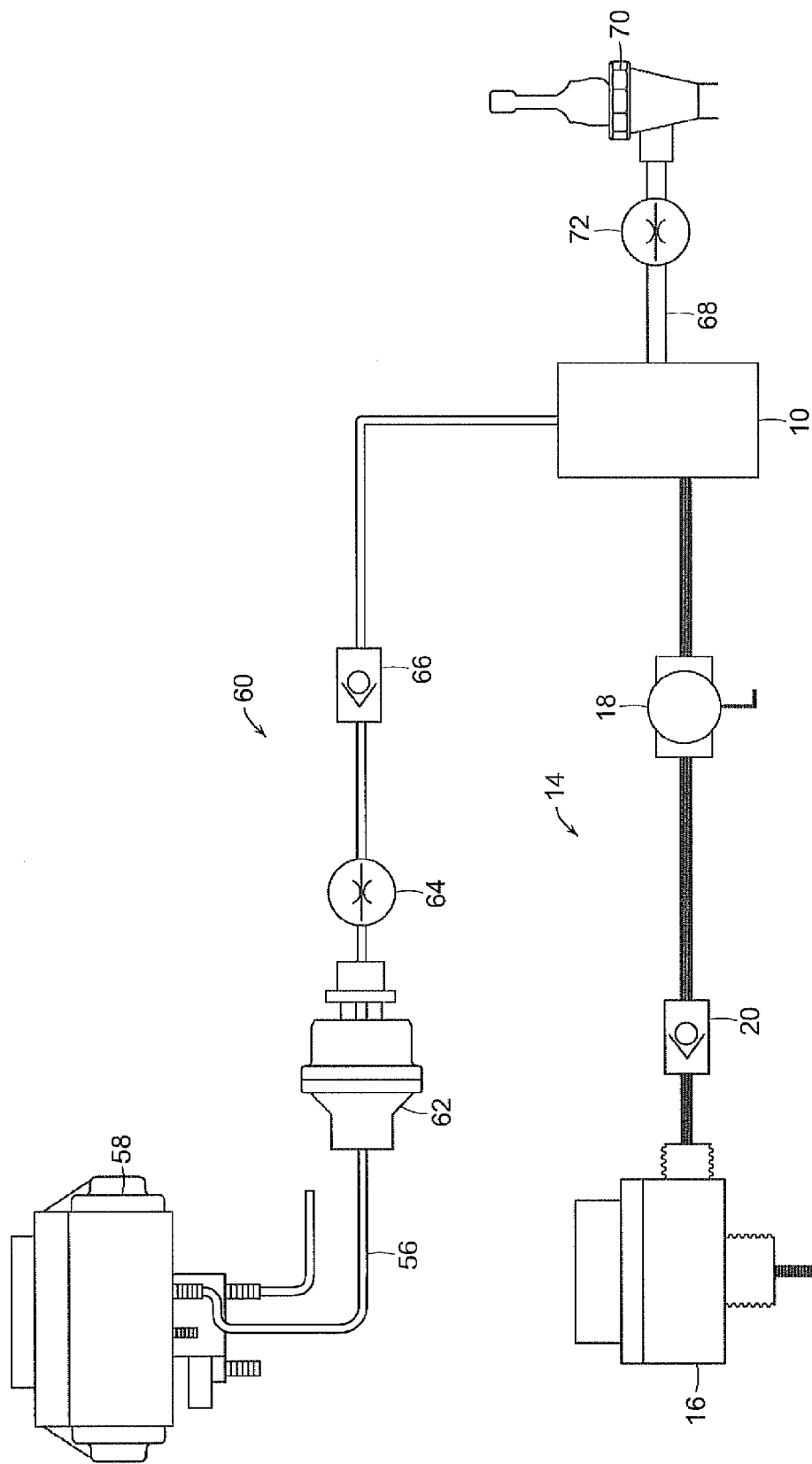
FIG. 1 is a diagrammatic illustration of a system in accordance with one embodiment of the present invention.

With reference initially to FIG. 1, one embodiment of a system in accordance with the present invention includes a mixing chamber 10. A first fluid component, e.g., a water diluent is received via conduit 12 from a municipal water source and is supplied to the mixing chamber via a first supply line 14. The first supply line includes a first constant flow valve 16, a downstream needle valve providing a first metering orifice 18, the size of which may be selectively varied, and an optional check valve 20 to prevent reverse fluid flow from the mixing chamber.

As herein employed, the term "constant flow valve" means a flow control valve of the type described, for example, in U.S. Pat. No. 7,617,839, and illustrated in greater detail in FIG. 3. The constant flow valve includes a housing made up of assembled exterior components 22, 24. The housing is internally subdivided by a barrier wall 26 into a head section 28 with an inlet 30, and base section subdivided by a modulating assembly 34 into a fluid chamber 36 segregated from a spring chamber 38.

The modulating assembly 34 includes and is supported by a flexible diaphragm 40, with a stem 42 that projects through a port 44 in the barrier wall 26. Stem 42 terminates in enlarged head 46 with a tapered underside 48 surrounded by a tapered surface 50 of the barrier wall. A spring 52 urges the modulating assembly 34 towards the barrier wall 26.

Figure 4A:
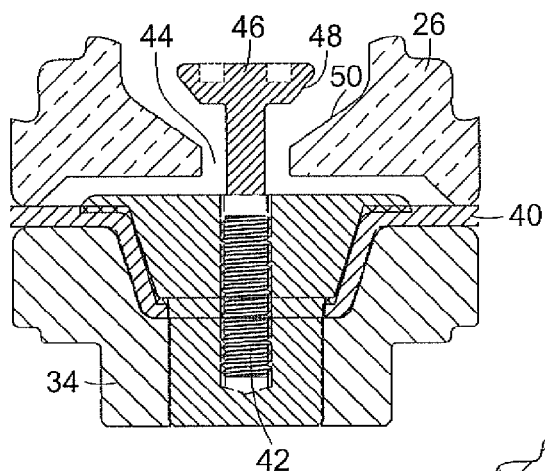
FIGS. 4A-4C are partial illustrations of interior components of the CFValve in various operational settings.

The valve inlet 30 is adapted to be connected to conduit 12, and a valve outlet 54 communicates with the fluid chamber 36 and is adapted to be connected to a remote system component, which in the system under consideration, is the mixing chamber 10. The valve inlet 30 and outlet 54 respectively lie on axes $A_1$, $A_2$ that are arranged at 90° with respect to each other. Port 44 connects the valve head section 28 to the fluid chamber 36. Inlet fluid pressures below a threshold level in the head section and fluid chamber are insufficient to overcome the closure force of spring 52, resulting as depicted in FIG. 4A in the diaphragm being held in a closed position against a sealing ring on the barrier wall, thus preventing fluid flow through the fluid chamber 36 and out through the valve outlet 54.

Figure 3:
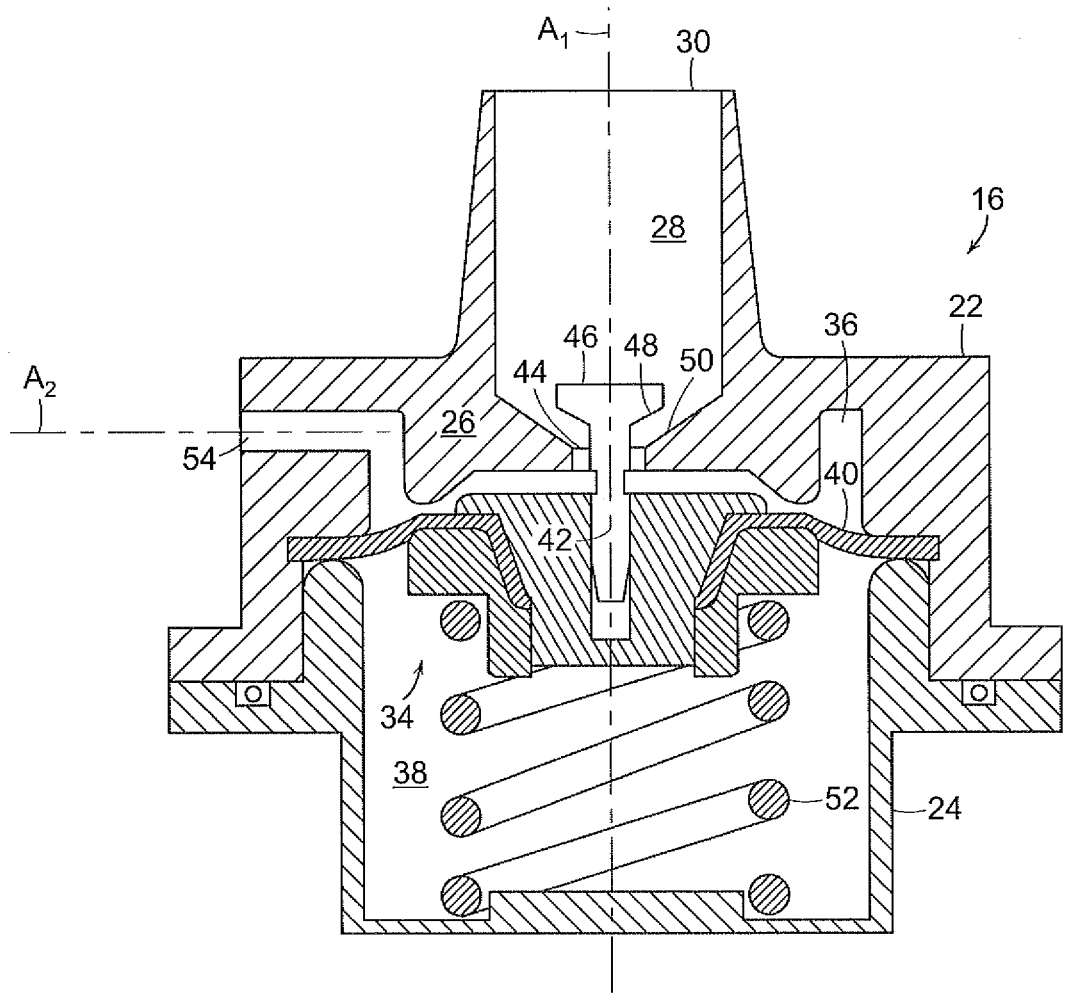
FIG. 3 is a cross sectional view take through a typical CFValve.
Figure 4B:
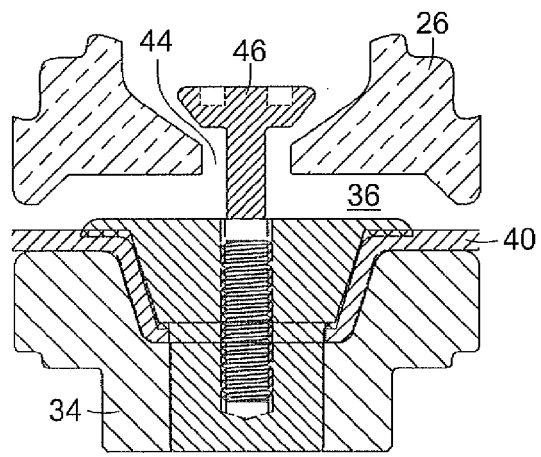

As shown in FIGS. 3 and 4B, at inlet pressures above the threshold level, the closure force of spring 52 is overcome, allowing the modulating assembly 34 and its diaphragm 40 to move away from the barrier wall 26 as operating pressure in the fluid chamber 36 increases. As fluid exits the fluid chamber, the downstream metering orifice 18 provides a flow restriction that creates a back pressure which adds to the inlet pressure to create a total operating pressure in the fluid chamber 36.

If the inlet pressure decreases, the force of spring 52 will urge the modulating assembly 34 towards the barrier wall 26, thus increasing the gap between the tapered surfaces 48, 50 and increasing the flow of fluid into the fluid chamber 36 in order to maintain the operating pressure substantially constant.

A decrease in back pressure will have the same effect, causing the modulating assembly to move towards the barrier wall until flow through the port 44 is increases sufficiently to restore the operating pressure to its previous level.

Conversely, an increase in back pressure will increase the operating pressure in fluid chamber 36, causing the modulating assembly to move away from the barrier wall, and reducing the gap between tapered surfaces 48, 50 to lessen the flow of fluid into and through the fluid chamber 36.

Figure 4C:
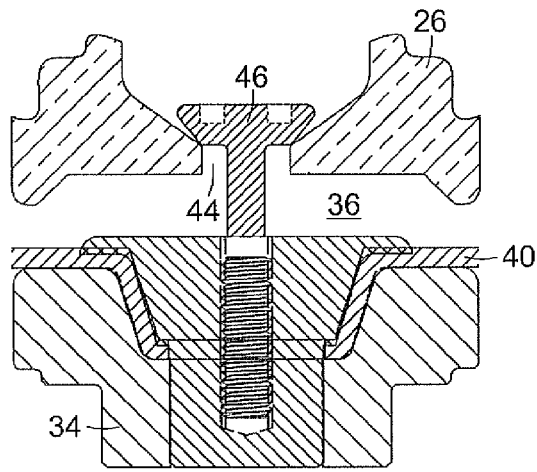

As shown in FIG. 4C, if the back pressure increases the operating pressure in fluid chamber 36 to a sufficiently high level, the modulating assembly will be moved away from the barrier wall to an extent sufficient to close the gap between tapered surfaces 48, 50, thus preventing any further flow through the valve.

Again with reference to FIG. 1, a second fluid component, e.g., a liquid tea concentrate, is received via conduit 56 and is supplied to the mixing chamber 10 via a second supply line 60. Conduit 56 is connected to a pressurized source of the second fluid component, one non limiting example being a pump 58. The second supply line includes a second constant flow valve 62, a downstream second metering orifice 64 having a fixed size, and another optional check valve 66. The second constant flow valve may be of a "straight through" type as described for example in U.S. Pat. No. 6,026,850 or 6,209,578, where the valve inlets and outlets lie on the same axis. The first and second constant flow valves 16, 22 serve to deliver the first and second fluid components to the mixing chamber 10 at substantially constant flow rates and pressures, irrespective of variations in the input pressures in the conduits 12, 56 above the threshold levels of the valves.

The first and second fluid components are combined in the mixing chamber to produce a fluid mixture having a mix ratio governed by the selected variable size of the first metering orifice 18 and the fixed size of the second metering orifice 64.

Although not shown, it will be understood that the locations of the first and second metering orifices 18, 64 may be reversed, with the adjustable metering orifice 18 being located in the second supply line 60 and the fixed metering orifice being located in the first supply line 14. Alternatively, both the first and second supply lines 14, 60 may be equipped with adjustable orifices.

A discharge line 68 leads from the mixing chamber 10 and through which the fluid mixture is delivered to a dispensing valve 70. A third metering orifice 72 is provided in the discharge line. As shown, the third metering orifice is upstream and separate from the dispensing valve. Alternatively, the third metering orifice may be included as an integral component of the dispensing valve.

When the dispensing valve is open, the discharge line 68 has a maximum flow rate that is lower than the combined minimum flow rates of the first and second constant flow valves 16, 62, thus creating a backpressure in the first and second supply lines 14, 60 downstream of their respective constant flow valves. This back pressure adds to the inlet pressures applied to the constant flow valves to maintain the valves in the operating conditions shown in FIGS. 3 and 4B to thereby maintain a substantially constant pressure and flow rate of the first and second fluid components being delivered to the mixing chamber.

Any adjustment to the size of the first metering orifice 18 will result in a change in the flow rate of the first fluid component to the mixing chamber 10. This in turn will change the backpressure in the mixing chamber and in the second supply line 60 downstream of the second constant flow valve 62, causing an accompanying inverse change to the flow rate of the second fluid component being delivered through the second constant flow valve to the mixing chamber, and in turn causing a change in the mix ratio of the mixture exiting from the mixing chamber to the dispensing valve 70. Although the mix ration is changed, the flow rate of the dispensed fluid mixture will remain substantially the same and substantially constant.

Closure of the dispensing valve 70 will produce elevated back pressures in the first and second supply lines 14, 60 downstream of their respective constant flow valves 16, 62, causing the valves to assume the closed settings as shown in FIG. 4C.

Figure 2:
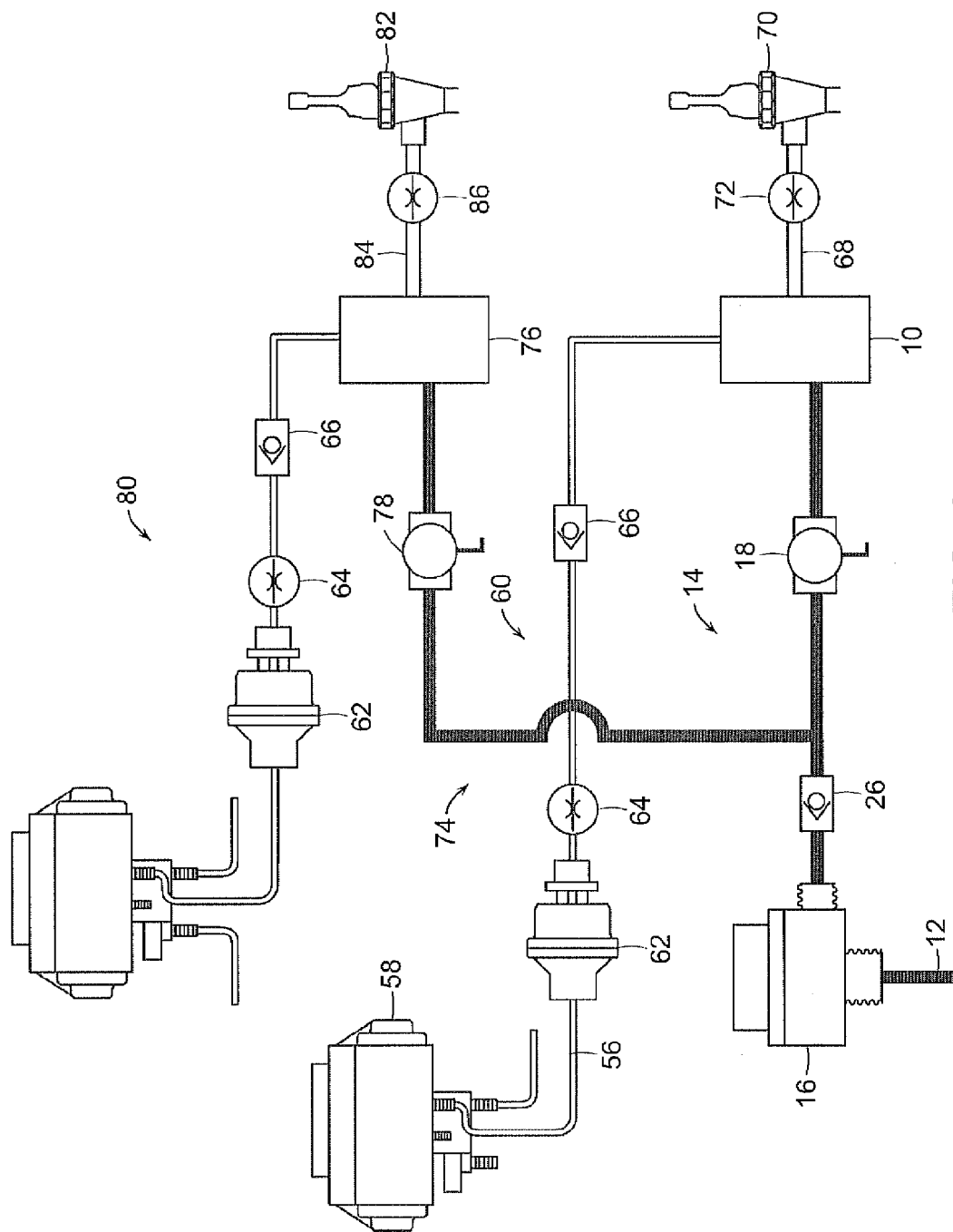
FIG. 2 is a diagrammatic illustration of another embodiment of a system in accordance with the present invention.

In the system embodiment illustrated in FIG. 2, a third supply line 74 leads from the first supply line 14 to a second mixing chamber 76. The third supply line 74 includes another adjustable metering orifice 78. The second mixing chamber 76 is supplied with another fluid component, e.g., a different tea concentrate, via a fourth supply line 80 having the same components as the second supply line 60. The fluid mixture exits from mixing chamber 76 to another dispensing valve 82 via a discharge line 84 having a metering orifice 86.

The dispensing valves 70, 82 may be selectively opened and closed, with constant flow valve 16 acting in concert with the constant flow valves 62 of either or both supply lines 60, 74 to maintain the selected mix ratios exiting from one or both mixing chambers 10, 76 at the same substantially constant volumes.

The invention claimed is:

1. A system for precisely metering and mixing fluids at variable mix rations, and for delivering the resulting fluid mixtures at the same substantially constant flow rates, said system comprising:
   a mixing chamber;
   a first supply line for supplying a first fluid component to said mixing chamber via a first constant flow valve and a downstream first metering orifice;
   a second supply line for supplying a second fluid component to said mixing chamber via a second constant flow valve and a downstream second metering orifice, said first and second fluid components being combined in said mixing chamber to produce a fluid mixture; and
   a discharge line leading from said mixing chamber and through which the fluid mixture is delivered to a dispensing valve, said discharge line, when said dispensing valve is open, having a maximum flow rate lower than the combined minimum flow rates of the first and second constant flow valves, thereby creating a fluid back pressure in said mixing chamber and in said first and second supply lines downstream of the respective first and second constant flow valves, the size of said first metering orifice being adjustable to change the flow rate of the first fluid component being fed to said mixing chamber, thereby changing the fluid back pressure in said mixing chamber and in said first supply line with an accompanying inverse change to the flow rate of the second fluid component being delivered through said second constant flow valve, resulting in a change in the mix ratio of said fluid mixture while maintaining a substantially constant flow rate of said fluid mixture being delivered via said discharge line.

2. The system of claim 1 wherein the size of said second metering orifice is fixed.

3. The system of claim 1 or 2 further comprising third metering orifice (j) in said discharge line between said dispensing valve and said mixing chamber, the size of said third metering orifice being fixed.

4. The system of claim 1 further comprising a third supply line leading from said first supply line to a second mixing chamber, said third supply line including a third metering orifice having an adjustable size, and a fourth supply line identical to said second supply line for supplying a third fluid component to said second mixing chamber, and a second discharge line identical to said first mentioned discharge line leading from said second mixing chamber to a second dispensing value.

* * * * *